United States Patent [19]

Konno et al.

[11] Patent Number: 5,358,339
[45] Date of Patent: Oct. 25, 1994

[54] HYDRODYNAMIC FLUID BEARING WITH LIQUID-RADIAL BEARING AND GAS-THRUST BEARING

[75] Inventors: Daisuke Konno; Yumiko Noda, both of Kanagawa, Japan

[73] Assignee: Ebara Corporation, Tokyo, Japan

[21] Appl. No.: 180,467

[22] Filed: Jan. 12, 1994

Related U.S. Application Data

[63] Continuation of Ser. No. 10,399, Jan. 28, 1993, abandoned.

[30] Foreign Application Priority Data

Jan. 30, 1992 [JP] Japan .................. 4-010092

[51] Int. Cl.$^5$ .................. F16C 32/06; F16C 33/72
[52] U.S. Cl. .................. 384/107; 384/112; 384/113; 384/134
[58] Field of Search .................. 384/100, 107, 109, 112, 384/113, 134

[56] References Cited

U.S. PATENT DOCUMENTS

| | | | |
|---|---|---|---|
| 3,420,583 | 1/1969 | Gerardus . | |
| 3,439,961 | 4/1969 | Stiles . | |
| 3,612,628 | 10/1971 | Steele | 384/107 |
| 3,726,572 | 4/1973 | Beardmore | 384/113 |
| 3,950,039 | 4/1976 | Huber et al. | 384/112 |
| 4,445,793 | 5/1984 | Shinohara | 384/130 |
| 4,795,275 | 1/1989 | Titcomb et al. | 384/107 |
| 4,934,836 | 6/1990 | Tanaka et al. | 384/100 |
| 5,114,245 | 5/1992 | Tanaka et al. | 384/112 |
| 5,141,338 | 8/1992 | Asada et al. | 384/114 |
| 5,142,173 | 8/1992 | Konno et al. | 384/107 X |

FOREIGN PATENT DOCUMENTS

| | | |
|---|---|---|
| 52-3059 | 1/1977 | Japan . |
| 61-2915 | 1/1986 | Japan . |
| 2149027 | 6/1985 | United Kingdom . |

*Primary Examiner*—Thomas R. Hannon
*Attorney, Agent, or Firm*—Wenderoth, Lind & Ponack

[57] ABSTRACT

A bearing device suitable for a spindle motor, which comprises a base, a spindle stood on a central portion of the base, a radial cylindrical member (4) fixed on the spindle, a pair of thrust plates (3) secured to both end surfaces of the radial cylindrical member, and a radial sleeve (6) rotatably supported by the thrust plates (3) and the radial sleeve (6), wherein a radial hydrodynamic bearing is formed by the radial cylindrical member (4) and the radial sleeve (6), thrust hydrodynamic bearings are formed by both end portions of the radial sleeve (6) and the thrust plates (3), a gas is employed as a fluid for generating dynamic pressure in the thrust hydrodynamic bearings, the radial bearing has a minute clearance, a chamfer portion is provided on the outer periphery of each end of the radial cylindrical member (4), and another chamfer portion is provided on the inner periphery of each end of the radial sleeve (6), thereby providing an air gap (13) at each axial end of the radial hydrodynamic bearing, which is surrounded by these chamfer portions and one thrust plate (3), a lubricating liquid is employed as a fluid for generating dynamic pressure in the radial hydrodynamic bearing, small holes (8) for collecting the lubricating liquid are formed in the outer peripheral surface of the radial cylindrical member (4), and lubricating liquid is sealed in the bearing clearance of the radial hydrodynamic bearing by virtue of the presence of the air gaps (13).

20 Claims, 6 Drawing Sheets

Fig. 2(a)  Fig. 2(b)
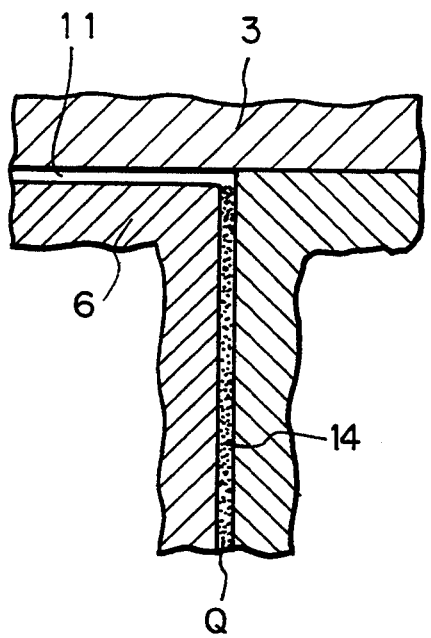
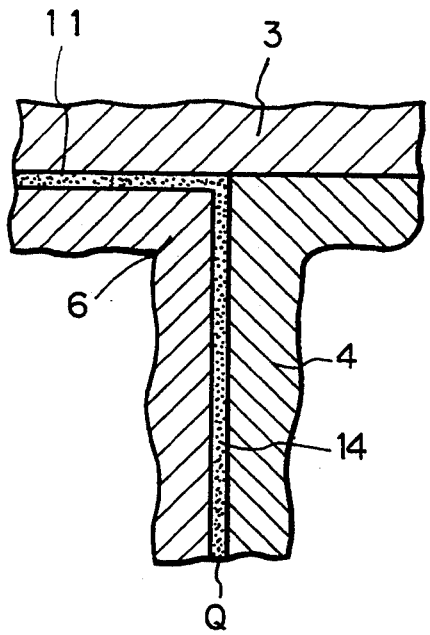
Fig. 3
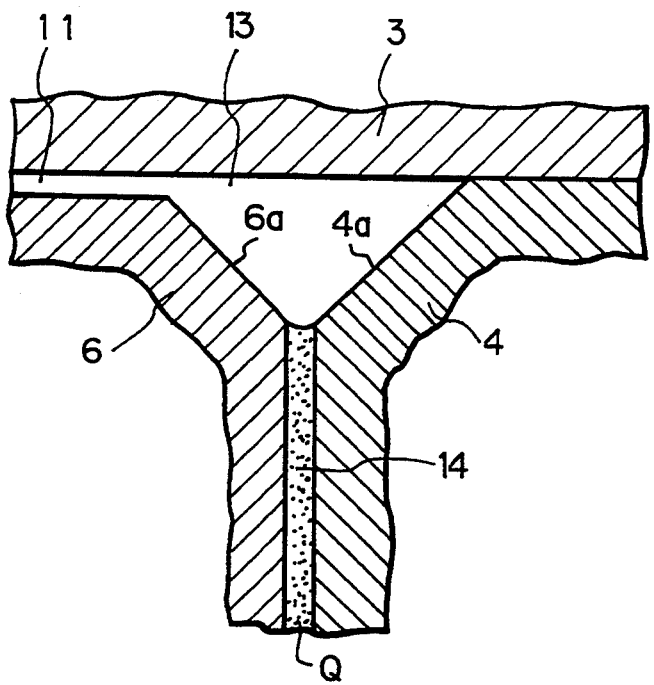

HYDRODYNAMIC FLUID BEARING WITH LIQUID-RADIAL BEARING AND GAS-THRUST BEARING

This application is a continuation of now abandoned application, Ser. No. 08/010,399, filed Jan. 28, 1993.

BACKGROUND OF THE INVENTION

1. Field of the Art

The present invention relates to a bearing device which has a liquid hydrodynamic bearing as a radial bearing, and a gas hydrodynamic bearing as a thrust bearing, and which supports a rotating object rotating at high speed. More particularly, the present invention relates to a bearing device suitable for a spindle motor used for driving a hard disk driver (hereinafter referred to as "HDD"), a laser beam printer driver (hereinafter referred to as "LBP"), a rotating drum device for a video system, etc., in which excellent rotating performance is required irrespective of the position of the motor.

2. Prior Art

With the achievement of high storage capacity and high-speed rotating performance in recent HDDs, the spindle motors which drive them have accordingly been demanded to have high performance. That is, it has been demanded to improve durability, cleanness and high-speed rotating performance and to minimize vibrations during rotation irrespective of the position of the motor when used, so as to be even more suitable for such HHDs.

FIG. 8 is a sectional view showing the structure of a conventional spindle motor for HDD. In FIG. 8, a mount (base) 31 has a support shaft (spindle) 32 stood on the central portion thereof. An annular thrust plate 33 is secured to the mount 31, and a radial cylindrical member 34 is concentrically secured to the support shaft 32. A plurality of circumferentially equally spaced stator coils 35 are secured to the support shaft 32 above the radial cylindrical member 34. A support member (hub) 36 having a cap-shaped configuration is provided on the support shaft 32. The ceiling portion at the upper end of the support member 36 is loosely fitted on the upper end portion of the support shaft 32. The support member 36 has an annular bearing member (serving as both radial and thrust sleeves) 37 secured to the lower end portion thereof. The annular member 37 has an L-shaped cross-sectional configuration. The lower end surface of the bearing member 37 faces the upper surface of the thrust plate 33, while the inner peripheral surface of the annular member 37 faces the outer peripheral surface of the radial cylindrical member 34. Either the lower end surface of the bearing member 37 or the upper surface of the thrust plate 33 is formed with spiral grooves for generating dynamic pressure in the thrust direction. Either the inner peripheral surface of the bearing member 37 or the outer peripheral surface of the radial bearing member 34 is formed with herringbone-shaped grooves for generating dynamic pressure in the radial direction.

A plurality of circumferentially equally spaced rotor magnets 38 are secured to the inner periphery of the support member 36 in opposing relation to the stator coils 35. As the stator coils 35 are sequentially supplied with an electric current, the support member 36 having the rotor magnets 38 begins to rotate, and consequently a pneumatic dynamic pressure is generated between the upper surface of the thrust plate 33 and the lower end surface of the bearing member 37, and a pneumatic dynamic pressure is similarly generated between the outer peripheral surface of the radial bearing member 34 and the inner peripheral surface of the bearing member 37. Thus, the upper surface of the thrust plate 33 and the lower end surface of the bearing member 37 constitute a thrust bearing, while the outer peripheral surface of the radial bearing member 34 and the inner peripheral surface of the bearing member 37 constitute a radial bearing. The support member 36 rotates while being supported by the thrust and radial bearings.

However, the above-described spindle motor suffers from the problem that, when it is operated in a horizontal position (i.e., in a direction in which the direction of gravity is perpendicular to the shaft of the motor), a moment in the radial direction is generated due to the gravity of the rotor, causing the axis of the rotor to be inclined with respect to the radial bearing, which results in an increase in the imbalance of radial magnetic force acting between the rotor magnets 38 and the stator coils 35, and in this state a rotor member is brought into local contact with the bearing.

Further, since the thrust plate and the radial bearing member are comprised of discrete members and are independently positioned on the mount, it is difficult to achieve the required perpendicularity between them at the time of assembly.

In addition, at the time of starting and stopping the spindle motor, the radial cylindrical member and the radial sleeve come in direct sliding contact with each other and hence wear is caused in the process of repeating start and stop.

In addition, the number of revolutions of scanner motors used in LBP is increasing year by year, so that it has become difficult for the conventional bearings to cope with the high rotational speed of these motors.

SUMMARY OF THE INVENTION

In view of the above-described problems of the prior art, it is an object of the present invention to provide a bearing device suitable for a spindle motor, which comprises a thrust and radial hydrodynamic bearings arranged to enable the spindle motor to exhibit excellent rotating performance and rotate with minimal vibrations irrespective of the position of the motor when used.

To solve the above-described problems, the present invention provides a bearing device comprising a base, a spindle stood on a central portion of said base, a hub, and radial and thrust hydrodynamic bearings provided between said spindle and said hub, a radial cylindrical member secured to the base so that the spindle extends through a central portion thereof, a pair of thrust plates secured to both end surfaces, respectively, of the radial cylindrical member and each having the spindle extending through a central portion thereof, a radial sleeve rotatably supported at an inner periphery and two end surfaces thereof by an outer peripheral surface of the radial cylindrical member and opposing inner surfaces of the two thrust plates respectively and secured to the hub, in which the radial cylindrical member and the radial sleeve constitute the radial hydrodynamic bearing, either two end portions of the radial sleeve or the opposing inner surfaces of the two thrust plates are provided with spiral grooves for generating dynamic pressure, and the two end portions of the radial sleeve and the thrust plates constitute the thrust hydrodynamic bearings, wherein a fluid for generating dynamic pressure in the thrust hydrodynamic bearings is a gas; the radial hydrodynamic bearing has a minute clearance; a chamfer portion is provided on an outer periphery of each end of the radial cylindrical member, and another chamfer portion is provided on an inner periphery of each end of the radial sleeve, thereby providing an air gap at each axial end of the radial hydrodynamic bearing, which is surrounded by the chamfer portion of the radial cylindrical member, the chamfer portion of the radial sleeve and one of the thrust plates; a fluid for generating dynamic pressure in the radial hydrodynamic bearing is a lubricating liquid, and a small hole for collecting the lubricating liquid is formed in an outer peripheral surface of the radial cylindrical member; and the lubricating liquid is sealed in the clearance of the radial hydrodynamic bearing by virtue of the presence of the air gaps, and a change in volume of the lubricating liquid at the time of rotation and stop is absorbed by the small hole.

In the bearing device having the above-described arrangement, the small hole, which is formed in the outer peripheral surface of the radial cylindrical member, may be either a through-hole that extends through the radial cylindrical member, or a hole that does not extend through the radial cylindrical member, with the inner end thereof being closed.

The bearing device, arranged as described above, may have a plurality of small holes which are formed in the outer peripheral surface of the radial cylindrical member at respective positions equally distributed either circumferentially and/or axially.

In the bearing device having the above-described arrangement, the lubricating liquid sealed in the radial hydrodynamic bearing may be a lubricating liquid having a low volatility and a kinematic viscosity below 10 cSt at 40° C.

In the bearing device having the above-described arrangement, the lubricating liquid may contain an electrically conductive substance.

In the bearing device having the above-described arrangement, the radial sleeve may be either a rotating member or a stationary member.

The bearing device having the above-described arrangement may be provided with means for generating magnetic attraction force in a thrust direction with respect to one of the thrust plates counter to an applied load.

In the bearing device having the above-described arrangement, the radial bearing may be disposed so as to support a rotor, rotatably supported by the bearing device, over a predetermined range including the center of gravity of the rotor.

In the bearing device of the present invention, the radial hydrodynamic bearing is arranged in the form of a lubricating liquid hydrodynamic bearing, and the thrust hydrodynamic bearing formed in the shape of gas hydrodynamic bearings, as described above. Thus, the load carrying capacity of the radial bearing improves markedly in comparison to gas hydrodynamic bearings. In addition, the lubrication condition at the time of start and stop improves, so that it is possible to reduce the wear of the radial bearing.

Further, since the clearance of the radial bearing is minute, the lubricating liquid can hardly enter an area other than the radial hydrodynamic bearing by the action of the interfacial tension thereof. In particular, since each air gap, which is surrounded by a chamfer portion of the radial cylindrical member, a chamfer portion of the radial sleeve and one thrust plate, is much wider than the clearances in the radial and thrust bearings, the interfacial tension of the lubricating liquid weakens in the air gap, so that the lubricating liquid cannot enter the thrust bearing clearance by passing through the air gap. In other words, the air gaps function so as to seal the lubricating liquid in the clearance of the radial bearing, and it is therefore possible to prevent the lubricating liquid from entering an are other than the radial hydrodynamic bearing.

Further, even if the lubricating liquid rises in temperature and hence increases in volume during rotation of the rotor, the excess lubricating liquid is effectively absorbed into the small holes of the radial cylindrical member. During suspension of the operation, the lubricating liquid lowers in temperature and hence decreases in volume. However, the lubricating liquid is supplied from the small holes to compensate for the decrease in the lubricating liquid in the bearing clearance. Since at this time the lubricating liquid is present only in the radial hydrodynamic bearing, as described above, it is possible to obtain an excellent lubrication condition for the radial hydrodynamic bearing.

Further, in the bearing device according to the present invention, no lubricating liquid is present in the thrust hydrodynamic bearings. Therefore, bearing loss is minimized, and no lubricating liquid is scattered by centrifugal force during high-speed rotation. Accordingly, it is possible to achieve high-speed rotation with the required degree of cleanness being maintained.

Further, by virtue of the above-described arrangement of the bearing device according to the present invention, it is possible to readily realize the required perpendicularity between each thrust plate and the radial cylindrical member at the time of assembly by clamping them together by using, for example, a fixing nut, provided that the thrust plates are produced so that the opposing inner surfaces thereof have the required flatness, and that each end surface and outer peripheral surface of the radial cylindrical member are at right angles to each other.

Since the spacings between the opposing inner surfaces of the thrust plates and the two end surfaces of the radial sleeve are determined by the difference in height of the radial cylindrical member and the radial sleeve, these members can readily be assembled with given spacings, provided that the radial cylindrical member and the radial sleeve, which are easy to machine, are produced with the correct height.

Since the radial sleeve functions as bearing members of both the radial and thrust bearings, the number of parts required to form the whole bearing structure decreases, and the structure of the bearing device is simplified.

If the motor is arranged in the form of an outer rotor type motor and the bearing assembly is disposed inside the stator core, the radial sleeve can be formed as either a stationary member or a rotating member. By positioning the center of gravity of the motor rotor within a predetermined range of the bearing structure, the rotor can rotate stably irrespective of the attitude of the motor when used.

If a lubricating liquid having a low volatility and a kinematic viscosity below 10 cSt at 40° C. is used, the lubricating liquid satisfactorily diffuses into the small holes or given portions of the bearing clearances. Accordingly, there is no possibility of the lubricating liquid being scattered as described above. Further, bearing loss is minimized, and the durability of the bearing device is improved.

If an electrically conductive substance is added to the lubricating liquid, static electricity produced on a magnetic recording medium in HDD, for example, can be effectively grounded to the stationary side, that is, ground by virtue of the conducting function of the electrically conductive substance. Accordingly, it is possible to prevent accumulation of static electricity in between the magnetic recording medium and the head.

By providing a means for producing magnetic attraction force in the thrust direction counter to the applied load, it is possible to reduce the load applied in the thrust direction by the weight of the rotor when a spindle motor is operated in a vertical position. Accordingly, it is possible to reduce the torque loss in the thrust bearings at the time of starting and stopping the motor and hence facilitate the start and stop of rotation of the motor. Thus, the wear of the bearing members is reduced, and the lifetime of the thrust bearings increases. When the spindle motor is operated in a horizontal position, the rotor is pressed against one thrust bearing by the action of the magnetic attraction force producing means and hence to rotor rotates on the base of the surface of this thrust bearing. Therefore, it is possible to suppress vibration in the thrust direction during rotation and obtain a high degree of rotational accuracy.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS:

FIGS. 2(a), 2(b) are views for explanation of an operation in a case where neither a radial cylindrical member nor a radial sleeve has a chamfer portion;

FIG. 3 is a view for explanation of an operation in a case where the radial cylindrical member and the radial sleeve are provided with respective chamfer portions, which form an air gap between the same a thrust plate;

PREFERRED EMBODIMENTS OF THE INVENTION

Figure 1:
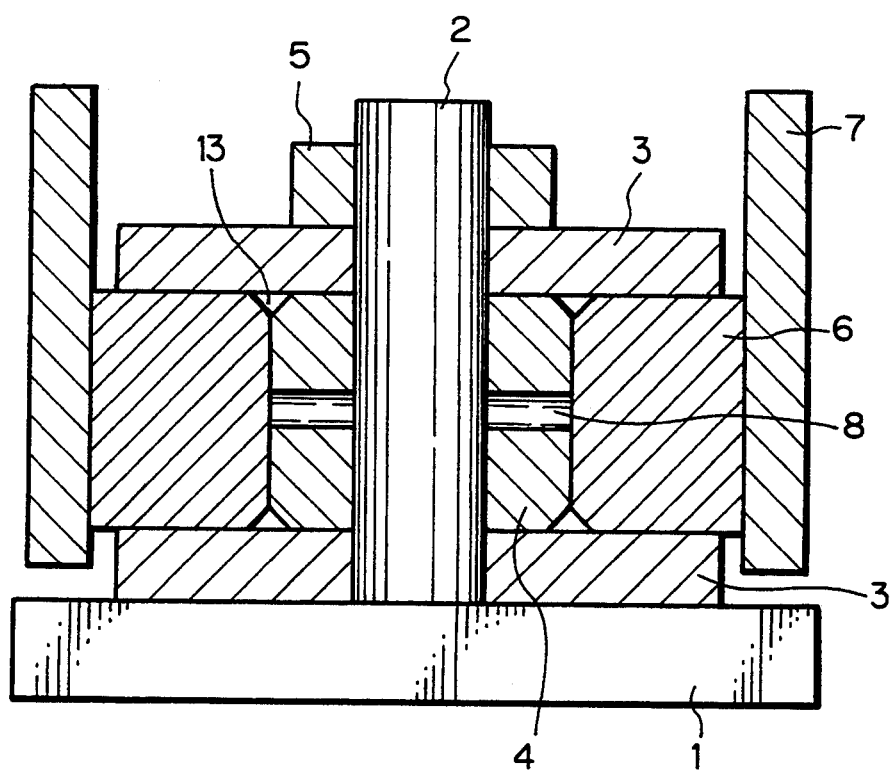
FIG. 1 is a sectional view showing the structure of one embodiment of the bearing device according to the present invention.

Embodiments of the present invention will be described below with reference to the accompanying drawings. FIG. 1 is a schematic sectional view showing the structure of one embodiment of the bearing device according to the present invention. In FIG. 1, a base 1 has a spindle 2 stood on the central portion thereof. A radial cylindrical member 4 is fixed on the spindle 2 with the spindle 2 extending through the central portion thereof. A pair of thrust plates 3 are secured to both end surfaces, respectively, of the radial cylindrical member 4. The spindle 2 extends through the central portion of the upper and lower thrust plates 3. A cylindrical radial sleeve 6 is secured to the inner periphery of a hub 7. The radial sleeve 6 is rotatably supported at the inner peripheral surface and two end surfaces thereof by the outer peripheral surface of the radial cylindrical member 4 and the opposing inner surfaces of the two thrust plates 3, respectively. The radial cylindrical member 4 and the radial sleeve 6 constitute a radial hydrodynamic bearing, while the two end portions of the radial sleeve 6 and the thrust plates 3 constitute thrust hydrodynamic bearings. The radial and thrust bearings constitute the bearing device of the present invention.

Figure 4:
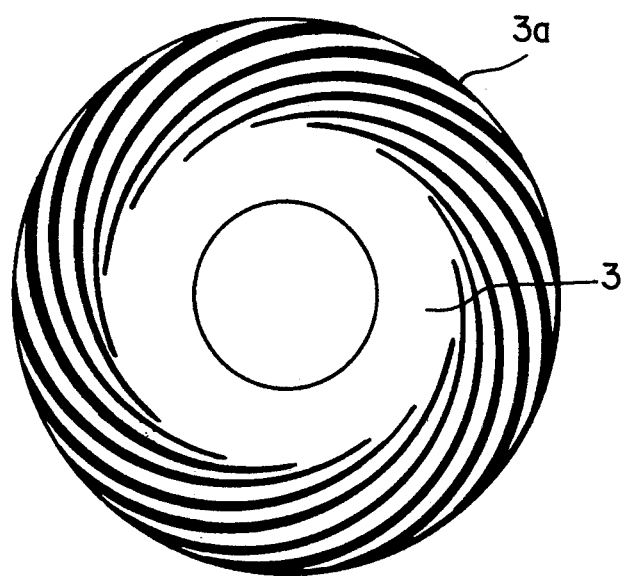
FIG. 4 shows spiral grooves for generating hydrodynamic pressure which are formed on a thrust plate.

The opposing inner surfaces of the two thrust plates 3 are provided with grooves for generating dynamic pressure, e.g., spiral grooves 3a, as shown in FIG. 4. Both end surfaces of the radial sleeve 6 are smoothed. The arrangement may also be such that the two end surfaces of the radial sleeve 6 are provided with grooves for generating dynamic pressure, while the opposing inner surfaces of the thrust plates 3 are smoothed. The clearance between the outer peripheral surface of the radial cylindrical member 4 and the inner peripheral surface of the radial sleeve 6 is minute (from several microns to several tens of microns). The outer peripheral surface of the radial cylindrical member 4 and the inner peripheral surface of the radial sleeve 6 are formed in the shape of smooth surfaces.

As shown in FIG. 3, a chamfer portion 4a is provided on the outer periphery of each end of the radial cylindrical member 4, and another chamfer portion 6a is provided on the inner periphery of each end of the radial sleeve 6, thereby providing an air gap 13 at each axial end of the radial hydrodynamic bearing, which is surrounded by the chamfer portion 4a, the chamfer portion 6a and the surface of one thrust plate 3 that faces these chamfer portions 4a and 6a. In addition, the outer peripheral surface of the radial cylindrical member 4 is provided with small holes 8 for collecting a liquid. The fluid used for generating dynamic pressure in the thrust bearings is a gas, e.g., air, while the fluid used for generating dynamic pressure in the radial bearing is a lubricating liquid.

In the bearing device having the above-described arrangement, when the hub 7 is rotated by applying rotational force thereto, hydrodynamic pressure is generated by the lubricating liquid in between the inner peripheral surface of the radial sleeve 6 and the outer peripheral surface of the radial cylindrical member 4, and hydrodynamic pressure is similarly generated by air or other gas in between the two end surfaces of the radial sleeve 6 and the opposing inner surfaces of the thrust plates 3. Thus, the radial sleeve 6 rotates while being supported by the radial cylindrical member 4 and the thrust plates 3.

By arranging the radial bearing, which comprises the radial cylindrical member 4 and the radial sleeve 6, in the form of a lubricating liquid hydrodynamic bearing, as described above, the load carrying capacity of the radial bearing improves markedly in comparison to gas hydrodynamic bearings. In addition, the lubrication condition at the time of start and stop improves, so that it is possible to reduce the wear of the radial cylindrical member 4 and the radial sleeve 6.

Further, since the clearance between the outer peripheral surface of the radial cylindrical member 4 and the inner peripheral surface of the radial sleeve 6, that is, the clearance of the radial bearing, is as minute as several microns to several tens of microns, the lubricating liquid can hardly enter an area other than the area of sliding contact between the outer peripheral surface of the radial cylindrical member 4 and the inner peripheral surface of the radial sleeve 6, that is, the radial hydrodynamic bearing surface, by the action of the interfacial tension. In addition, since each air gap 13, which is surrounded by a chamfer portion of the radial cylindrical member 4, a chamfer portion of the radial sleeve 6 and one thrust plate 3, is larger than the above-described clearance, the interfacial tension of the lubricating liquid weakens in the air gap 13. That is, the interfacial tension in the radial clearance is cut off by the air gap 13, so that the lubricating liquid cannot enter the thrust clearance by passing through the air gap.

The action of the air gap 13, which lies between the chamfer portion 4a of the radial cylindrical member 4, the chamfer portion 6a of the radial sleeve 6 and the surface of the thrust plate 3 that faces these chamber portions 4a and 6a, will be explained below in more detail. If such chamfer portions are not present, a lubricating liquid Q, which is sealed in the clearance 14 between the outer peripheral surface of the radial cylindrical member 4 and the inner peripheral surface of the radial sleeve 6, is present only in the clearance 14 in the initial state, as shown in FIG. 2(a), and it will not enter the clearance 11 between the end surface of the radial sleeve 6 and the surface of the thrust plate 3 that faces it. However, since the clearance 11 is minute, the lubricating liquid Q enters the clearance 11 by capillarity as time goes by, as shown in FIG. 2(b). Consequently, the lubricating liquid Q undesirably serves as a fluid that generates dynamic pressure in the thrust hydrodynamic bearing. Therefore, the bearing loss becomes greater than in the case of the air hydrodynamic bearing, so that it becomes difficult to achieve high-speed rotation.

In contrast to the above, if an air gap 13 having an inverted triangle-shaped cross-sectional configuration is defined between the chamber portion 4a of the radial cylindrical member 4, the chamfer portion 6a of the radial sleeve 6 and the surface of the thrust plate 3 that faces these chamber portions 4a and 6a, as shown in FIG. 3, since the air gap 13 is much wider than the clearance 14, the interfacial tension in the air gap 13 weakens, so that the lubricating liquid Q sealed in the clearance 14 of the radial hydrodynamic bearing will not enter the air gap 13 of inverted triangle-shaped cross-sectional configuration. Accordingly, there is no possibility of the lubricating liquid Q entering the clearance 11 between the end surface of the radial sleeve 6 and the surface of the thrust plate 3 that faces it. In addition, since the clearance 14 of the radial bearing is minute, the lubricating liquid Q is held on the outer peripheral surface of the radial cylindrical member 4 and the inner peripheral surface of the radial sleeve 6 by the action of the surface tension. Therefore, there is no likelihood that the lubricating liquid Q will flow out of the clearance 14.

By virtue of the presence of the small holes 8, which are provided in the outer peripheral surface of the radial cylindrical member 4, even if the lubricating liquid Q rises in temperature and hence increases in volume during rotation of the rotor, the excess lubricating liquid is effectively absorbed into the small holes 8. Conversely, during suspension of the operation, the lubricating liquid Q lowers in temperature and hence decreases in volume. In such a case, however, the decrease in the lubricating liquid Q is compensated for by the lubricating liquid supplied from the small holes 8. In such cases, since the clearance 14 of the radial hydrodynamic bearing is minute, no air bubble can be present in between the small holes 8 and the clearance 14. Consequently, there is no possibility that the lubricating liquid in the small holes 8 will be cut off from the lubricating liquid in the clearance 14 by air bubbles. There is therefore no likelihood that the lubricating liquid will be prevented from being absorbed into or supplied from the small holes 8 by the surface tension of the lubricating liquid. When the lubricating liquid is to be applied during the assembly operation, the clearance 14 of the radial hydrodynamic bearing can be filled uniformly with a proper quantity of lubricating liquid by filling the small holes 8 of the radial cylindrical member 4 with lubricating liquid sufficiently before the assembly of the bearing device and then fitting the radial cylindrical member 4 into the radial sleeve 6. Accordingly, it becomes unnecessary to control the quantity of lubricating liquid, which is very small. Thus, the application of the lubricating liquid becomes extremely easy.

As the above-described lubricating liquid, one which has a low volatility and a kinematic viscosity below 10 cSt at 40° C. is used. If the kinematic viscosity of the lubricating liquid is 10 cSt or higher, bearing loss due to the viscosity of the lubricating liquid becomes large, so that it is difficult to achieve high-speed rotation. Some of the lubricating liquids that have a kinematic viscosity below 10 cSt contain a volatile component of normal volume. However, if a lubricating liquid containing such normal volatility is employed in the bearing device of this invention, the bearing lifetime will be short because the bearing device has no function of externally supplying a lubricating liquid except for the small holes 8. For this reason, in this invention a lubricating liquid which has a low volatility and a kinematic viscosity below 10 cSt at 40° C. is preferably selected. Further, it is possible to use not only oils but also other substances which are used as general heating media or solvents as long as the volatility is low and the kinematic viscosity at 40° C. is below 10 cSt. In this embodiment, a hydrocarbon oil or a fluorocarbon heating media is employed as a lubricating liquid.

In the bearing device of this embodiment, the radial hydrodynamic bearing does not necessarily need grooves for generating dynamic pressure. Dynamic pressure generating grooves may be formed on the inner peripheral surface of the radial sleeve 6, with the outer peripheral surface of the radial cylindrical member 4 being smoothed. Conversely, dynamic pressure generating grooves may be formed on the outer peripheral surface of the radial cylindrical member 4, with the inner peripheral surface of the radial sleeve 6 being smoothed. There is no particular restriction on materials for members constituting bearings, that is, the radial cylindrical member 4, the thrust plates 3, and the radial sleeve 6. It is possible to use any material which can be machined with a high degree of accuracy. Examples of usable materials include general metallic materials, ceramic materials, organic materials, etc.

Figure 5:
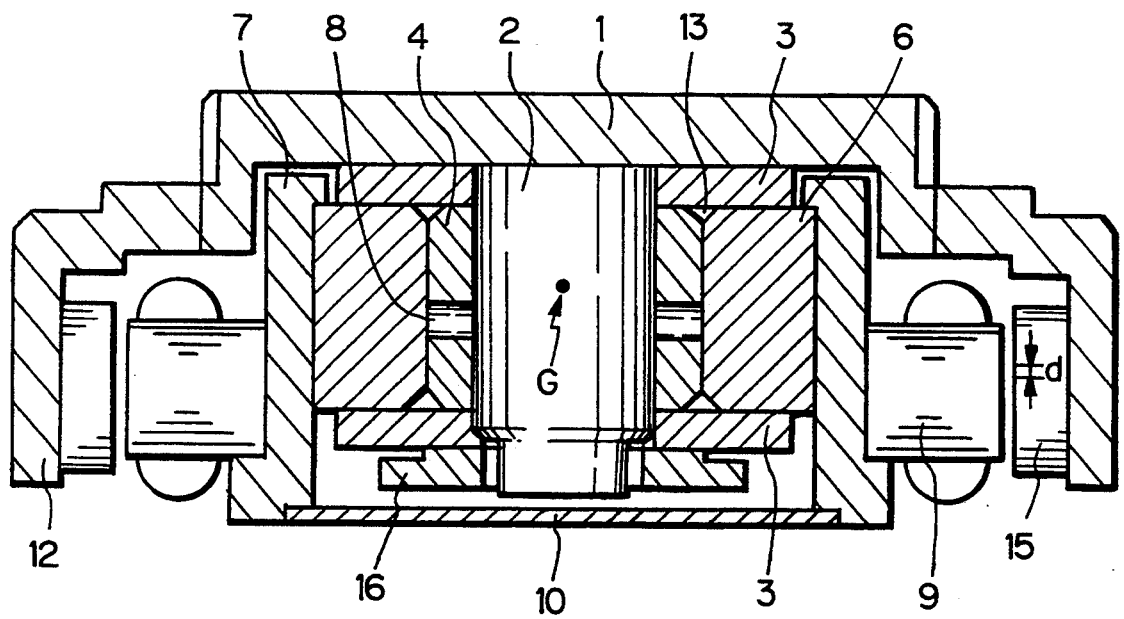
FIG. 5 is a sectional view showing the arrangement of a spindle motor employing the bearing device of the present invention.

If an electrically conductive substance is added to the above-described lubricating liquid, the following advantageous effect is obtained. That is, when the bearing device of the present invention is used for, for example, a spindle motor for driving HDD, arranged as shown in FIG. 5, static electricity produced on a magnetic recording medium secured either directly or indirectly to the base 1 is effectively grounded to the stationary side of a mount 10 through the base 1, the spindle 2, the radial cylindrical member 4, the lubricating liquid present in the clearance 14, the radial sleeve 6 and the hub 7. Accordingly, no static electricity will be accumulated on rotating members, particularly the magnetic recording medium. It is therefore possible to prevent destruction of information recorded on the magnetic recording medium.

The lubricating liquid may be made electrically conductive by adding an electrically conductive substance thereto. Any kind of material may be used as an electrically conductive substance. For example, at least one kind of surface-active agent or polyoxyethylene additive or graphite powder is selected as an electrically conductive substance.

With the above-described arrangement of the bearing device, at all times there is no lubricating liquid present in the clearances defined between the opposing inner surfaces of the thrust plates 3 and the two end surfaces of the radial sleeve 6. Therefore, even if the radial sleeve 6, that is, the rotor, rotates at high speed, no lubricating liquid is scattered by centrifugal force. Accordingly, it is possible to achieve high-speed rotation.

By virtue of the above-described arrangement of the bearing device, the perpendicularity required between the thrust plates 3 and the radial cylindrical member 4 can readily be realized by bringing the two end surfaces of the radial cylindrical member 4 into contact with the opposing inner surfaces of the thrust plates 3 and clamping them together by using a fixing member (nut) 5, provided that the thrust plates 3 are produced so that the opposing inner surfaces thereof have the required flatness, and the radial cylindrical member 4 is produced so that each end surface and outer peripheral surface thereof are at right angles to each other. In addition, since the spacings between the opposing inner surfaces of the thrust plates 3 and the two end surfaces of the radial sleeve 6 are determined by the difference in height of the radial cylindrical member 4 and the radial sleeve 6, these spacings can readily be set at given values, provided that the radial cylindrical member 4 and the radial sleeve 6, which are easy to machine, are produced with the correct height. In addition, since the radial sleeve 6 functions as bearing members of both the radial and thrust bearings, the number of parts required to form the bearing device decreases, and the structure is simplified.

Although in the above-described bearing device the base 1, the spindle 2, the radial cylindrical member 4 and the thrust plates 3 are formed as stationary members, while the hub 7 and the radial sleeve 6 are formed as rotating members, it should be noted that the above-described stationary and rotating members may be replaced with each other. That is, the arrangement may be such that the base 1, the spindle 2, the radial cylindrical member 4 and the thrust plates 3 are formed as rotating members, while the hub 7 and the radial sleeve 6 are formed as stationary members.

FIG. 5 is a sectional view showing the arrangement of a spindle motor that employs the bearing device of the present invention. The bearing device for the spindle motor is arranged in the same way as the bearing device shown in FIG. 1. That is, the bearing device includes a base 1, a spindle 2 stood on the central portion of the base 1, a radial cylindrical member 4 having the spindle 2 extending through the central portion thereof, a pair of thrust plates 3 secured to both end surfaces, respectively, of the radial cylindrical member 4 and each having the spindle 2 extending through the central portion thereof, and a radial sleeve 6 that is rotatably supported at the inner peripheral surface and two end surfaces thereof by the outer peripheral surface of the radial cylindrical member 4 and the opposing inner surfaces of the two thrust plates 3 respectively and that is secured to the inner periphery of a hub 7. The radial cylindrical member 4 and the radial sleeve 6 constitute a radial hydrodynamic bearing, while the two end portions of the radial sleeve 6 and the thrust plates 3 constitute thrust hydrodynamic bearings. However, unlike the arrangement shown in FIG. 1, the base 1, the spindle 2, the radial cylindrical member 4 and the thrust plates 3 are formed as rotating members.

In addition, a chamfer portion is formed on the outer periphery of each end of the radial cylindrical member 4, and another chamfer portion is formed on the inner periphery of each end of the radial sleeve 6 (see FIG. 3), thereby forming an air gap 13 at each axial end of the radial hydrodynamic bearing, which is defined between the chamfer portions and the surface of one thrust plate 3 that faces these chamber portions. Further, small holes 8 are provided in the outer peripheral surface of the radial cylindrical member 4. The diameter $\phi$ of the small holes 8 is 0.8 mm. A lubricating liquid is employed as a fluid for generating dynamic pressure in the radial hydrodynamic bearing, while a gas, e.g., air, is employed as a fluid for generating dynamic pressure in the thrust hydrodynamic bearings. In these points also, the bearing device shown in FIG. 5 is substantially the same as the bearing device shown in FIG. 1. It should be noted that reference numeral 16 in FIG. 5 denotes a nut used to secure the thrust plates 3 and the radial cylindrical member 4 to the spindle 2.

A back yoke 12 may be secured to the outer periphery of the base 1. Alternatively, the back yoke 12 may be formed integrally with the base 1. A plurality of circumferentially equally spaced stator coils 9 (including a stator core) are secured to the outer periphery of the hub 7. A plurality of circumferentially equally spaced rotor magnets 15 are secured to the inner peripheral surface of the back yoke 12 in opposing relation to the stator coils 9. The lower end of the hub 7 is secured to the mount 10.

In the spindle motor arranged as shown in FIG. 5, as the stator coils 9 are sequentially supplied with an electric current, the motor rotor, which comprises the back yoke 12 having the rotor magnets 15 secured to the inner peripheral surface thereof, rotates. That is, the motor rotor, which comprises the base 1 and the back yoke 12, rotates in a state where the outer peripheral surface of the radial cylindrical member 4, which is secured to the spindle 2, is rotatably supported by the inner peripheral surface of the radial sleeve 6, while the opposing inner surfaces of the thrust plates 3, which are secured to both ends, respectively, of the radial cylindrical member 4, are rotatably supported by both end surfaces of the radial sleeve 6.

In the spindle motor having the above-described arrangement, the axial magnetic centers of the stator coils 9 and the rotor coils 15 are offset from each other by d so that magnetic attraction force acts in the thrust direction counter to the applied load. With this arrangement, when the spindle motor is operated in a vertical position, it is possible to reduce the load applied in the thrust direction by the weight of the rotor (comprising the back yoke 12, the base 1, the spindle 2, the magnetic disk, etc.). Accordingly, it is possible to reduce the torque loss in the thrust bearings at the time of starting and stopping the motor and hence facilitate the start and stop of rotation of the motor. Thus, the wear of the bearing members is reduced, and the lifetime of the thrust bearing increases. When the spindle motor is operated in a horizontal position, the rotor is pressed against one thrust bearing by the action of offset magnetic attraction force producing means and hence rotates on the base of the surface of this thrust bearing. Therefore, it is possible to suppress vibration in the thrust direction during rotation and obtain a high degree of rotational accuracy.

Further, by positioning the center of gravity G of the rotor within a predetermined range of the bearing structure, the rotor can rotate stably irrespective of the attitude of the motor when used.

Figure 6:
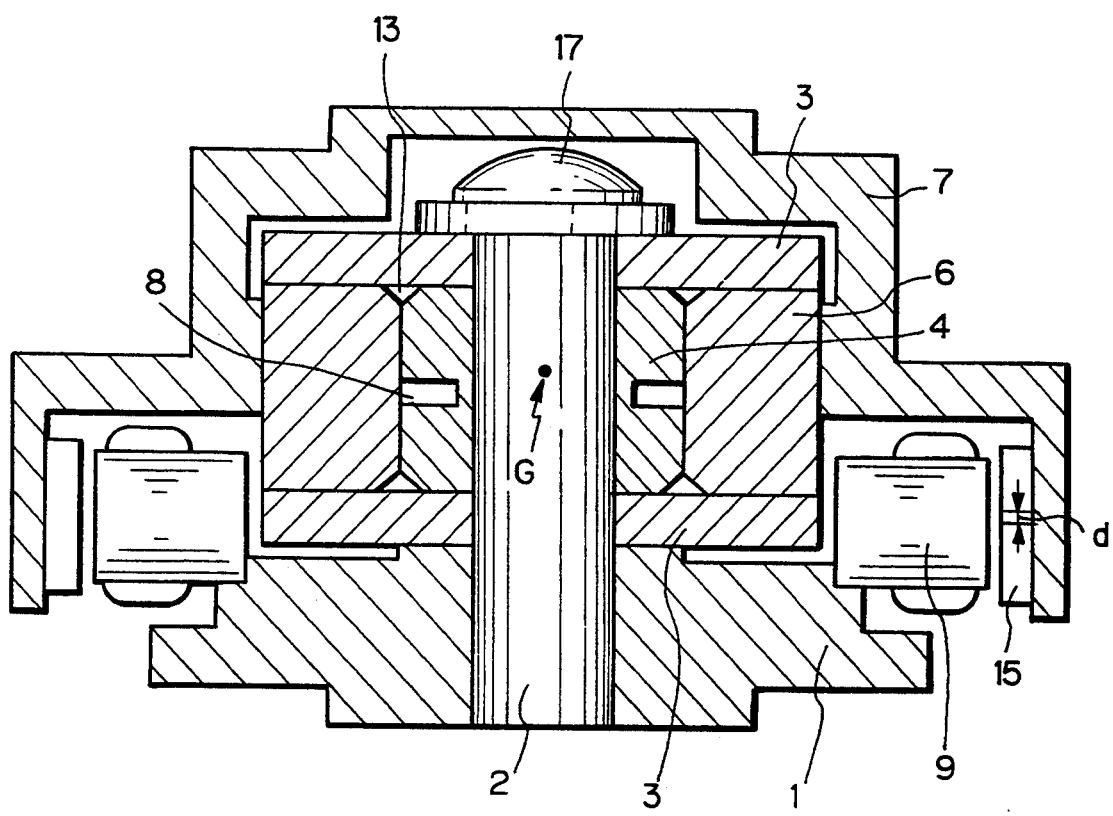
FIG. 6 is a sectional view showing the arrangement of another spindle motor employing the bearing device of the present invention.

FIG. 6 is a sectional view showing the arrangement of another spindle motor that employs the bearing device of the present invention. The bearing device for the spindle motor is arranged in the same way as the bearing devices shown in FIGS. 1 and 5. That is, the bearing device includes a base 1, a spindle 2 stood on the central portion of the base 1, a radial cylindrical member 4 having the spindle 2 extending through the central portion thereof, a pair of thrust plates 3 secured to both end surfaces, respectively, of the radial cylindrical member 4 and each having the spindle 2 extending through the central portion thereof, and a radial sleeve 6 that is rotatably supported at the inner peripheral surface and two end surfaces thereof by the outer peripheral surface of the radial cylindrical member 4 and the opposing inner surfaces of the two thrust plates 3 respectively and that is secured to the inner periphery of a hub 7. The radial cylindrical member 4 and the radial sleeve 6 constitute a radial hydrodynamic bearing, while the two end portions of the radial sleeve 6 and the thrust plates 3 constitute thrust hydrodynamic bearings. However, unlike the arrangement shown in FIG. 5, the base 1, the spindle 2 and the radial cylindrical member 4 are formed as stationary members (in the same way as in the arrangement shown in FIG. 1).

In addition, a chamfer portion is formed on the outer periphery of each end of the radial cylindrical member 4, and another chamfer portion is formed on the inner periphery of each end of the radial sleeve 6, thereby forming an air gap 13 at each axial end of the radial hydrodynamic bearing, which is defined between the chamfer portions and the surface of one thrust plate 3 that faces these chamber portions. Further, small holes 8, the inner ends of which are closed, are provided in the outer peripheral surface of the radial cylindrical member 4. The diameter $\phi$ of the small holes 8 is 0.5 mm. A lubricating liquid is employed as a fluid for generating dynamic pressure in the radial hydrodynamic bearing, while a gas, e.g., air, is employed as a fluid for generating dynamic pressure in the thrust hydrodynamic bearings. In these points also, the bearing device shown in FIG. 6 is substantially the same as the bearing devices shown in FIGS. 1 and 5. It should be noted that reference numeral 17 in FIG. 6 denotes a bolt used to secure the thrust plates 3 and the radial cylindrical member 4 to the spindle 2.

A plurality of circumferentially equally spaced stator coils 9 (including a stator core) are secured to the outer periphery of the base 1. A plurality of circumferentially equally spaced rotor magnets 15 are secured to the inner peripheral surface of the hub 7 in opposing relation to the stator coils 9. That is, the hub 7 constitutes a back yoke.

In the spindle motor arranged as shown in FIG. 6, as the stator coils 9 are sequentially supplied with an electric current, the hub 7, which has the rotor magnets 15 secured to the inner peripheral surface thereof, rotates. That is, the hub 7 rotates in a state where the inner peripheral surface of the radial sleeve 6 is rotatably supported by the outer peripheral surface of the radial cylindrical member 4, which is secured to the spindle 2, while the two end surfaces of the radial sleeve 6 are rotatably supported by the opposing inner surfaces of the thrust plates 3, which are secured to the two ends, respectively, of the radial cylindrical member 4.

In the spindle motor arranged as shown in FIG. 6, as in FIG. 5, the axial magnetic centers of the stator coils 9 and the rotor coils 15 are offset from each other by d so that magnetic attraction force acts in the thrust direction counter to the applied load. Further, the center of gravity G of the rotor (comprising the hub 7, the radial sleeve 6, the rotor magnets 15, magnetic disk, etc.) is positioned within a predetermined range of the bearing structure. By virtue of the above-described arrangement, advantageous effects similar to those in the spindle motor shown in FIG. 5 are obtained.

Figure 7A:
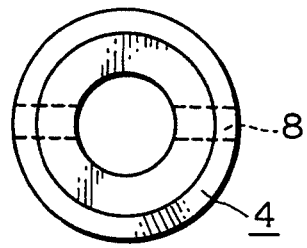
FIGS. 7(a) to 7(f) show various forms of small holes which are formed in the radial cylindrical member.
Figure 7B:
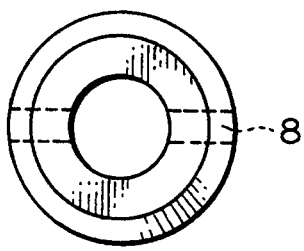
Figure 7C:
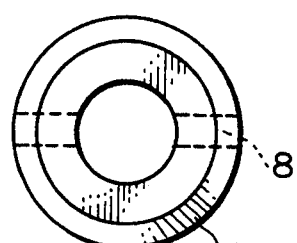
Figure 7C:
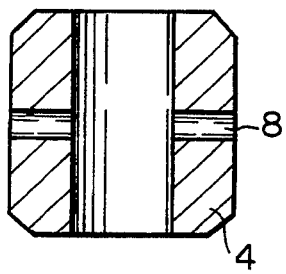
Figure 7C:
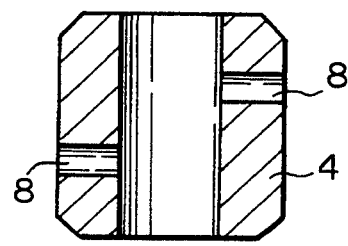
Figure 7C:
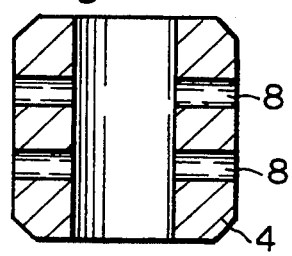
Figure 7D:
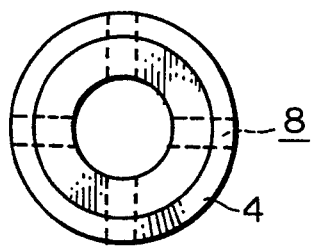
Figure 7E:
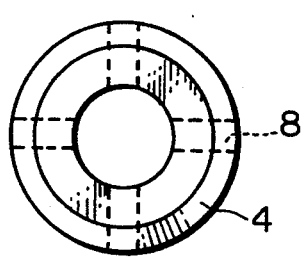
Figure 7F:
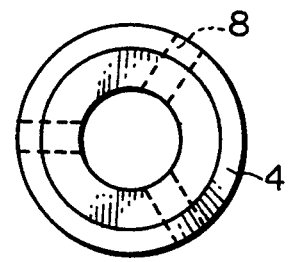
Figure 7F:
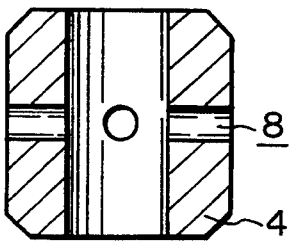
Figure 7F:
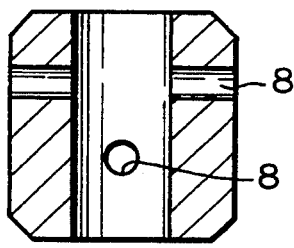
Figure 7F:
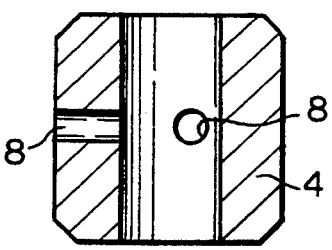
Figure 8:
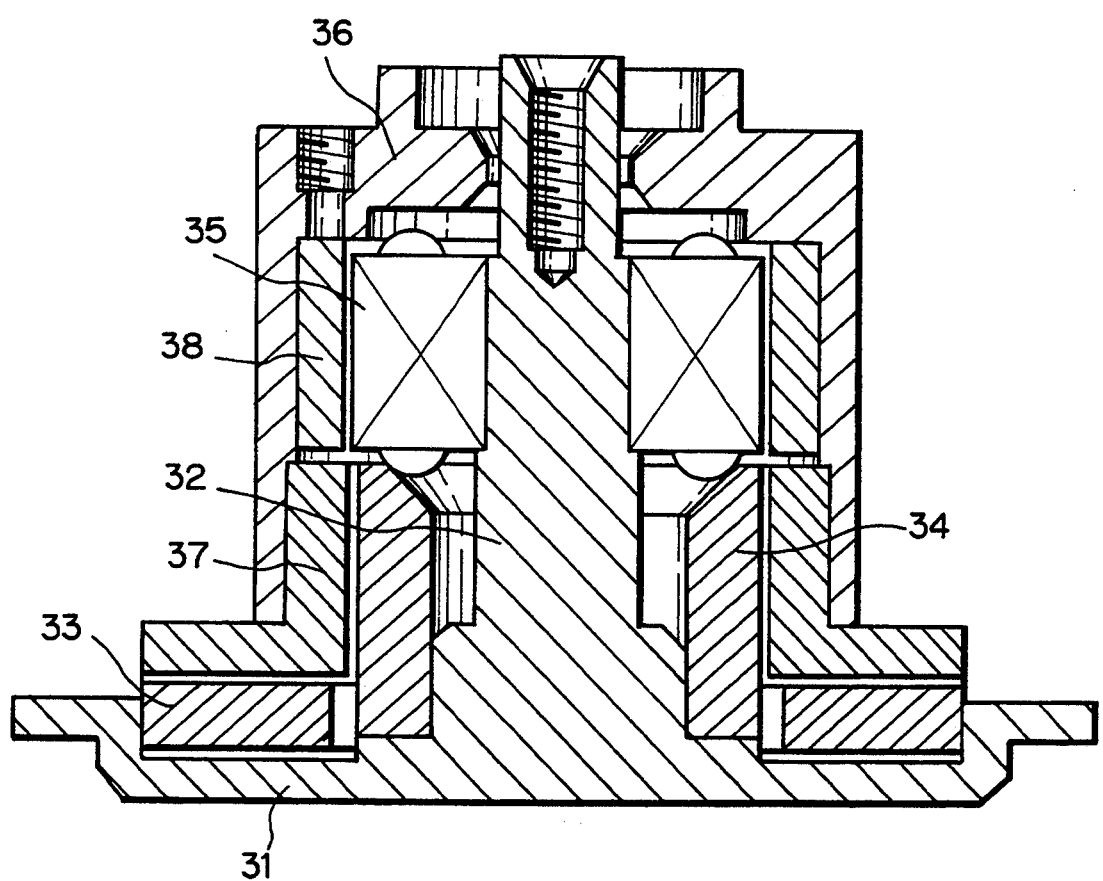
FIG. 8 is a sectional view showing the arrangement of a spindle motor employing a conventional bearing device.

Although in the embodiments shown in FIGS. 1 and 5, the small holes 8 are through-holes that extend through the radial cylindrical member 4, the small holes 8 are not necessarily limited to such through-holes. The small holes 8 may be holes that do not extend through the radial cylindrical member 4, that is, they may be holes the inner ends of which are closed, as shown in FIG. 6. Alternatively, the small holes 8 may be tapered. Further, the small holes 8 may be formed in various positions, as shown in FIGS. 7(a) to 7(f). That is, in FIGS. 7(a) and 7(a'), a pair of small through-holes 8 are formed in the right and left portions, respectively, of the radial cylindrical member 4. In FIGS. 7(b) and 7(b'), a pair of small through-holes 8 are formed in the right and left portions, respectively, of the radial cylindrical member 4 at respective positions which are axially offset from each other. In FIGS. 7(c and 7(c'), two pairs of small through-holes 8 are formed in the right and left portions, respectively, of the radial cylindrical member 4 at two axially spaced positions. In FIGS. 7(d) and 7(d'), four small through-holes 8 are formed in four circumferentially equally spaced portions, respectively, of the radial cylindrical member 4. In FIGS. 7(e) and 7(e'), four small through-holes 8 are formed in four circumferentially equally spaced portions, respectively, of the radial cylindrical member 4 at two axially spaced positions. In FIGS. 7(f) and 7(f'), three small through-holes 8 are formed in three circumferentially equally spaced portions, respectively, of the radial cylindrical member 4. It should be noted that FIGS. 7(a) to 7(f) each show plan and sectional views of the radial cylindrical member 4.

As has been described above, the present invention provides an excellent bearing device having the following advantages.

(1) The bearing device has a radial hydrodynamic bearing arranged in the form of a lubricating liquid hydrodynamic bearing, and thrust hydrodynamic bearings formed in the form of gas hydrodynamic bearings. Thus, the load carrying capacity of the radial bearing improves markedly in comparison to gas hydrodynamic bearings. In addition, the lubrication condition at the time of start and stop improves, so that it is possible to reduce the wear of the radial bearing. Further, since no lubricating liquid is present in the thrust hydrodynamic bearings, there is no possibility that a lubricating liquid will be scattered by centrifugal force during high-speed rotation. Accordingly, the bearing device is excellent in durability and cleanness and provides high-speed rotating performance. Thus, the bearing device of the present invention is suitable for a spindle motor in which these performances are demanded.

(2) At the time of assembly, it is possible to readily realize the required perpendicularity between each thrust plate and the radial cylindrical member and the required gap between each thrust plate and an end surface of the radial sleeve by clamping them together by using, for example, a fixing nut, provided that the radial cylindrical member and the radial sleeve, which are easy to machine, are produced with the correct height, and the thrust plates are produced so that the opposing inner surfaces thereof have the required flatness, and that each end surface and outer peripheral surface of the radial cylindrical member are at right angles to each other.

(3) Since the radial sleeve functions as bearing members for both the radial and thrust bearings, the number of parts required to form the whole bearing structure decreases and the structure of the bearing device is simplified.

(4) If the motor is arranged in the form of an outer rotor type motor and the bearing assembly is disposed inside the stator core, the radial sleeve can be formed as either a stationary member or a rotating member. By positioning the center of gravity of the motor rotor within a predetermined range of the bearing structure, the rotor can rotate stably irrespective of the attitude of the motor when used. Accordingly, it is possible to realize a bearing device suitable for a spindle motor which is demanded to exhibit stable rotating performance irrespective of the attitude of the motor when used.

(5) If an electrically conductive liquid is employed as a lubricating liquid, static electricity produced on a magnetic recording medium in HDD, for example, can be effectively grounded to the stationary side (ground) by virtue of the conducting function of the electrically conductive liquid. Accordingly, it is possible to prevent accumulation of static electricity in between the magnetic recording medium and the head. Thus, the bearing device is suitable for a spindle motor for driving HDD or other similar device.

(6) By providing a means for producing magnetic attraction force in the thrust direction counter to the applied load, it is possible to reduce the load applied in the thrust direction by the weight of the rotor when a spindle motor is operated in a vertical position. Accordingly, it is possible to reduce the torque loss in the thrust bearings at the time of starting and stopping the motor and hence facilitate the start and stop of rotation of the motor. Thus, the wear of the bearing members is reduced, and the lifetime of the thrust bearings increases. When the spindle motor is operated in a horizontal position, the rotor is pressed against one thrust bearing by the action of magnetic attraction force producing means and hence rotates on the base of the surface of this thrust bearing. Therefore, it is possible to suppress vibration in the thrust direction during rotation and obtain a high degree of rotational accuracy.

What is claimed is:

1. In a bearing device comprising a base, a spindle stood on a central portion of said base, a hub, and radial and thrust hydrodynamic bearings provided between said spindle and said hub, a radial cylindrical member is secured to said base so that said spindle extends through a central portion thereof, a pair of thrust plates are secured to both end surfaces, respectively, of said radial cylindrical member and each having said spindle extending through a central portion thereof, a radial sleeve is rotatably supported at an inner periphery and two end surfaces thereof by an outer peripheral surface of said radial cylindrical member and opposing inner surfaces of said two thrust plates respectively and secured to said hub, said radial cylindrical member and said radial sleeve constitute said radial hydrodynamic bearing, either two end portions of said radial sleeve or the opposing inner surfaces of said two thrust plates are provided with spiral grooves for generating dynamic pressure, and the two end portions of said radial sleeve and said thrust plates constitute said thrust hydrodynamic bearings:

a fluid for generating dynamic pressure in said thrust hydrodynamic bearings is a gas;

said radial hydrodynamic bearing has a minute clearance;

a chamfer portion is provided on an outer periphery of each end of said radial cylindrical member, and another chamfer portion is provided on an inner periphery of each end of said radial sleeve, thereby providing an air gap at each axial end of said radial hydrodynamic bearing, which is surrounded by the chamfer portion of said radial cylindrical member, the chamfer portion of said radial sleeve and one of said thrust plates;

a fluid for generating dynamic pressure in said radial hydrodynamic bearing is a lubricating liquid, and a small hole for collecting said lubricating liquid is formed in an outer peripheral surface of said radial cylindrical member; and said lubricating liquid is sealed in the clearance of said radial hydrodynamic bearing by virtue of the presence of said air gaps, and a change in volume of said lubricating liquid at the time of rotation and stop is absorbed by said small hole.

2. A bearing device according to claim 1, wherein said small hole, which is formed in the outer peripheral surface of said radial cylindrical member, is a through-hole that extends through said radial cylindrical member.

3. A bearing device according to claim 2, wherein a plurality of said small holes are formed in the outer peripheral surface of said radial cylindrical member at respective positions equally spaced either circumferentially and/or axially.

4. A bearing device according to claim 3, wherein said radial bearing is disposed so as to support a rotor, rotatably supported by said bearing device, over a predetermined range including a center of gravity of said rotor.

5. A bearing device according to claim 2, wherein said radial bearing is disposed so as to support a rotor, rotatably supported by said bearing device, over a predetermined range including a center of gravity of said rotor.

6. A bearing device according to claim 1, wherein said small hole, which is formed in the outer peripheral surface of said radial cylindrical member, is a hole that does not extend through said radial cylindrical member, with an inner end thereof being closed.

7. A bearing device according to claim 6, wherein a plurality of said small holes are formed in the outer peripheral surface of said radial cylindrical member at respective positions equally spaced either circumferentially and/or axially.

8. A bearing device according to claim 7, wherein said radial bearing is disposed so as to support a rotor, rotatably supported by said bearing device, over a predetermined range including a center of gravity of said rotor.

9. A bearing device according to claim 6, wherein said radial bearing is disposed so as to support a rotor, rotatably supported by said bearing device, over a predetermined range including a center of gravity of said rotor.

10. A bearing device according to claim 1, wherein the lubricating liquid sealed in said radial hydrodynamic bearing has a low volatility and a kinematic viscosity below 10 cSt at 40° C.

11. A bearing device according to claim 10, wherein said radial bearing is disposed so as to support a rotor, rotatably supported by said bearing device, over a predetermined range including a center of gravity of said rotor.

12. A bearing device according to claim 10, wherein said lubricating liquid contains an electrically conductive substance.

13. A bearing device according to claim 12, wherein said radial bearing is disposed so as to support a rotor, rotatably supported by said bearing device, over a predetermined range including a center of gravity of said rotor.

14. A bearing device according to claim 1, wherein said radial sleeve is a rotating member.

15. A bearing device according to claim 14, wherein said radial bearing is disposed so as to support a rotor, rotatably supported by said bearing device, over a predetermined range including a center of gravity of said rotor.

16. A bearing device according to claim 1, wherein said radial sleeve is a stationary member.

17. A bearing device according to claim 16, wherein said radial bearing is disposed so as to support a rotor, rotatably supported by said bearing device, over a predetermined range including a center of gravity of said rotor.

18. A bearing device according to claim 16, which is provided with means for generating magnetic attraction force in a thrust direction with respect to one of said thrust plates counter to an applied load.

19. A bearing device according to claim 18, wherein said radial bearing is disposed so as to support a rotor, rotatably supported by said bearing device, over a predetermined range including a center of gravity of said rotor.

20. A bearing device according to claim 1 wherein said radial bearing is disposed so as to support a rotor, rotatably supported by said bearing device, over a predetermined range including a center of gravity of said rotor.

* * * * *

UNITED STATES PATENT AND TRADEMARK OFFICE
CERTIFICATE OF CORRECTION

PATENT NO. : 5,358,339
DATED : October 25, 1994
INVENTOR(S) : Daisuke KONNO et al.

It is certified that error appears in the above-indentified patent and that said Letters Patent is hereby corrected as shown below:

On title page, under the Foreign Application Priority Data of Item [30], the priority application number has been changed to —4-040092—.

Signed and Sealed this

Thirty-first Day of January, 1995

BRUCE LEHMAN

Attest:

Attesting Officer     Commissioner of Patents and Trademarks